and Sept. 20, 1960

2,953,622
BATTERY SEPARATORS AND PRODUCTION THEREOF

Daniel M. Gray, Sewickley, Pa., assignor to American-Marietta Company, Stoner-Mudge Co. Division, Chicago, Ill., a corporation of Illinois No Drawing. Filed Feb. 26, 1957, Ser. No. 642,351

14 Claims. (Cl. 136—143)

This invention relates to battery separators, and to the production thereof, with particular reference to electrolyte-permeable separators required for use between the positive and negative plates in lead-acid storage batteries.

Wood separators have long been used on a large scale, because certain woods, after extraction of their lignin and other non-cellulosic content, are sufficiently permeable to the acid electrolyte and impermeable to the lead compounds in the plates, to serve the purpose with reasonable efficiency. However, wood tends to deteriorate in the presence of the various chemicals in the battery, and various other separators have been devised to increase the battery life, but only at greater cost. The decreasing supply of the best wood for the purpose, and the advent of batteries which are shipped dry, and filled with electrolyte at the time of sale, have intensified the search for a relatively low-cost substitute for wood for battery separators, especially as wood separators are subject to deterioration as a result of drying out during periods of dry storage. Paper cannot be used as such, primarily because of lack of chemical resistance, but paper separators impregnated with certain resins have been found acceptable for use on a commercial scale.

Among the requirements which a resin impregnated paper battery separator should possess are the following:

(1) Chemical resistance to sulfuric acid at concentrations of about 30% by weight in water, and also to lead compounds, under anticipated service conditions (under 100° F. for most of the life of the battery, with brief periods of higher temperatures), and while being subjected to heavy charge or discharge loads;

(2) Permit free physical movements of the ions of the electrolyte solution through the separator;

(3) Physical characteristics of stiffness sufficient to maintain any rib formation in the separator at maximum anticipated temperatures (about 160° F.) in order to prevent permanent collapse of the ribs during brief periods of high temperatures;

(4) Porosity of the completed separator sufficient to allow absorption of the battery electrolyte while preventing penetration by particles of active material from the battery plates;

(5) Resist the oxidizing action of the nascent oxygen generated when the battery is discharged;

(6) Relatively low cost production of the separator, taking into account particularly the cost of the resin and solvent used for impregnation, and the number of operations necessary to complete the separator.

An acceptable commercial battery paper separator has been made utilizing a phenolic resin as an impregnant. The phenolic resin is normally applied in an aqueous solution which wets the paper and tends to swell and weaken the paper fibers. This has the undesirable effect of introducing the resin into the interior of the paper fibers as well as around the outside of the paper fibers. Further, the use of phenolic resin in accordance with the practice of the prior art leads to embrittlement of the finished separator as a result of the subjection of the separator to prolonged exposure to elevated temperature and to wide variations in temperature. This embrittlement is a serious matter since batteries are normally subjected to severe vibration in use and the weakened fiber together with the embrittled resin leads to failure of the battery as the result of separator breakage.

The impregnating phenolic resin oxidizes in the presence of the sulphuric acid usually employed as the electrolyte. As a result the phenolic impregnated paper separators deteriorate both within the fibers and outside of the fibers of the paper separator after the electrolyte is introduced into the battery at the start of its service life. This deterioration through oxidation also contributes to battery failure as a result of separator breakage as discussed hereinbefore.

A further disadvantage of phenolic resins as employed in the prior art is the fact that the provision of a phenolic impregnated battery separator having any reasonable service life has required the use of a relatively large amount of resin. Specifically, it has been the practice to utilize a phenolic resin pick-up on the paper of at least about 40% by weight based on the dry weight of the paper which is impregnated and normally about 50% on the said weight basis is employed.

Other resins are available which have higher chemical resistance, but their substitution for phenolic resin as the impregnant has not readily accomplished a desirable battery separator product. For example, many vinyl polymers have excellent chemical resistance, but they form impervious films rather than a porous layer. Polyvinyl chloride, although very resistant to most chemicals, is one of these unsuitable vinyl polymers. Further, it is insoluble in all but the most active organic solvents, which are expensive to employ. Even in active solvents it dissolves only to a limited extent.

Copolymers of vinyl chloride and vinyl acetate, to cite another example, have the defect that the acetate radical hydrolyzes in a sulfuric acid electrolyte. Thus, although this copolymer is more soluble than polyvinyl chloride, the solvents used must still contain a very considerable proportion of the more active organic solvents which adds to the cost. The hydrolysis of this copolymer forms acetic acid, which attacks the lead of the battery and thereby injures the battery.

In accordance with the present invention, battery separators are produced by impregnating porous paper stock with a resin selected from certain copolymers of vinyl chloride and vinylidene chloride. Such resins are strongly resistant to attack by sulfuric acid electrolyte, extremely resistant to oxidation, and yet are soluble in aromatic hydrocarbon solvents (i.e., benzene, toluene and xylene, and their higher boiling homologs). Since no water is used in the solvent mixture, the resin does not penetrate into the fibers of the paper used for the separator. Instead, the resin fuses in a protective film around the respective fibers when the solvent is expelled by evaporation. Consequently less of the polymer is needed to impregnate the paper, because it is not absorbed into the fibers.

Further, the high chemical resistance of the vinylidene chloride copolymer makes less of it necessary to protect the fibers. The reduced amount of resin required, together with the low cost of the aromatic solvents in which it can be dissolved, result in lowered cost of the separators produced in accordance with the invention.

The absence of water in the solvent avoids swelling of the paper fibers, and consequently the web is less likely to break during processing. The strength of the paper stock remains substantially unimpaired before, during and after processing.

Surprisingly, the vinyl chloride/vinylidene chloride copolymer of the invention does not bridge-over between the fibers to form an impervious film. Consequently the separators of the invention have a porosity of the degree necessary for efficient movement of the ions of the electrolyte solution between the battery plates, while still preventing the "treeing" of the active compounds of the plates into the separator, which can short circuit the plates.

The resin impregnant in accordance with the invention comprises, as an essential ingredient, a resin which consists essentially of a copolymer of vinyl chloride, constituting about 30% to about 75% by weight of the copolymer, and vinylidene chloride, constituting the balance of the copolymer. Outside of this range of proportions, at either end of the range, the solubility characteristics of the resin in organic solvents become so poor that the resin would be unsuitable for the purposes of the invention.

The essential resin ingredient of the invention is preferably free of homopolymers of vinyl chloride and vinylidene chloride, and is characterized by complete solubility in xylene at 25% solids concentration, and by a specific viscosity of about 0.12 to about 0.30, as determined at 25° C., using a 0.4% solution of the resin in nitrobenzene. A specific viscosity below the stated range is an indication of brittleness and thermal instability of the fused resin, and above the stated range is an indication of excessively high solution viscosity for purposes of impregnating paper for battery separators.

The solvents used to dissolve the resin for purposes of applying it to a paper stock, can consist entirely of one or a mixture of liquid aromatic hydrocarbon solvents, i.e., benzene, toluene, xylene, and their higher boiling homologs, such as ethyl benzene and isopropyl benzene. Mixed commercial aromatic hydrocarbon solvents, such as "Solvesso #100," of Esso Standard Oil Company, New York, N.Y., are also suitable. Of all of the available solvents, toluene and xylene, and mixtures thereof, are preferred. Full solubility of the resin in solvent consisting solely of liquid aromatic hydrocarbon solvents, can be obtained with solids concentrations of the resin as high as about 50% on a dry weight basis in such solvents. By varying such solids concentration from a minimum of about 15%, suitable viscosities for the purposes of the invention may be obtained. For practical purposes, a range of about 25% to about 35% resin solids is preferred, in order to impregnate the paper in a single pass through the resin solution.

The viscosity of the vinyl chloride/vinylidene chloride copolymers of the invention, when dissolved in suitable solvents will vary depending upon many factors. For a preferred copolymer such as "Geon 222" dissolved in xylene, a solution of 20 parts by weight of copolymer in 80 parts of xylene, has a viscosity of about 22 seconds in #4 Ford cup at 80° F.; and a solution of 32 parts of "Geon 222" in 68 parts of toluene, has a viscosity of about 200 seconds in #4 Ford cup at 80° F.

The aromatic hydrocarbon solvents preferred for the purposes of the invention, because of their low cost, can be replaced in whole or in part by more active organic solvents, such as ketone and ester solvents; e.g., methyl ethyl ketone, methyl isobutyl ketone, cyclohexanone, isophorone, ethyl acetate and butyl propionate. Small amounts of up to about 2% of alcohols may also be used for such purposes as assisting in filtration of the solution.

The paper impregnated in accordance with the invention may be any suitable porous paper stock, and for purposes of making separators for automobile batteries, the paper stock should have a thickness of about 0.028 to about 0.040 inch. Paper containing at least 90% alpha cellulose is preferred, and the present preferred example is a white alpha cellulose paper, having a weight per ream (500 sheets each 24 x 36 inches) of about 125 pounds, a thickness of about .031 inch (.030 min., .032 max.), and a porosity, in terms of air permeability before impregnation, of about 4.5 seconds as determined by use of a standard Gurley-Hill S—P—S densitometer set to measure air permeability in terms of the time required to pass 200 cc. of air under a pressure differential of 0.044 pound per square inch through one square inch of the tested sheet, the air being at about atmospheric pressure and at a temperature of about 70° F.

The paper stock selected for the purposes of the invention must have such initial porosity, before impregnation, that the completed separator of such paper, after impregnation of the resin, will have a porosity, measured in terms of air permeability, of about 2 to about 10 seconds as determined by the above-mentioned Gurley densitometer. If the impregnated sheet, after evaporation of the solvent, has too much porosity, i.e., less than about 2 seconds, as determined by the Gurley densitometer, it will be susceptible to penetration of "trees" of the active lead compound on the positive plates of a battery, and hence will be unsuitable for use as a battery separator: and if it has too little porosity, i.e., more than about 10 seconds, as determined by the Gurley densitometer, it will not absorb enough of the electrolyte and hence will have excessive resistance (measured in ohms per square inch) to be suitable for use as a battery separator. The resistance of a separator soaked in battery acid should be as small as possible, and a value of about 0.030 ohm per square inch, which is considered good, is attainable in accordance with the invention. A resistance of more than 0.06 ohm per square inch is undesirable for heavy discharge batteries such as most automobile batteries. In the case of batteries having lower discharge requirements, the separator resistance may be higher.

For purposes of reducing processing costs by using a minimum of solvent to obtain a given viscosity, the preferred resin for the purposes of the invention is a copolymer of vinyl chloride and vinylidene chloride in proportions by weight of 60/40. In cases, however, where the separator is to retain substantially maximum physical stiffness at temperatures over 150° F., the resin is preferably selected from those copolymers of vinyl chloride and vinylidene chloride having softening points higher than 150° F., i.e., copolymers of vinyl chloride in proportions of about 30% to about 45% by weight, the balance being of vinylidene chloride. For example, copolymers of vinyl chloride and vinylidene chloride in proportions of 30/70 have a softening point of about 203° F., and of 40/60 have a softening point of about 167° F.

When impregnating paper in accordance with the invention, the vinyl chloride/vinylidene chloride resin is dissolved in a non-aqueous organic solvent solution. The solution may be at room temperature (about 70° F.) or a higher temperature, preferably not over 128° F., for the purpose of reducing viscosity to improve penetration and to enable the use of a higher resin solid content in the solution. If the solution contains more than 20% resin solids on a dry weight basis, only one pass through the bath is necessary. The paper is permitted to remain in the resin solution for a brief time sufficient to enable the solution to saturate the paper. When the paper is removed from the solution, it is wiped to remove excess solution and then dried. Drying is normally performed in a baking oven using a temperature in the range of about 100° F. to about 300° F. for such period (about 5 to 10 minutes) as may be necessary to evaporate and expel all of the solvent in the solution applied to the web.

Wherever "parts" are referred to herein, parts by weight is intended.

EXAMPLE I

*Copolymer of vinyl chloride and vinylidene chloride*

An example of the resin of the invention is made as follows: 82 parts of vinyl chloride and 18 parts of vinylidene chloride are placed together in a glass container at 20° C. and exposed, with agitation, to ultraviolet light, such as may be provided with a 100 watt GE-7 mercury vapor lamp. After 36 to 72 hours of such treatment the resulting mixture of copolymer and unreacted monomers is removed from the container and dried to remove the unreacted monomers. A copolymer of approximately 60% vinyl chloride and 40% vinylidene chloride is obtained, because the vinylidene chloride enters the copolymer at a faster rate than the vinyl chloride. Copolymers with other ratios of vinyl chloride and vinylidene chloride content may be prepared in a like manner by varying the proportions of the starting charges of vinyl chloride and vinylidene chloride. Other methods of producing a usable copolymer may be employed, such as the above method without ultraviolet light but with a catalyst, such as benzoyl peroxide, and, if necessary, with subsequent filtration to remove the homopolymers which are not soluble in aromatic hydrocarbon solvents. An example of a suitable commercially available copolymer of vinyl chloride and vinylidene chloride is "Geon 222" of B. F. Goodrich Chemical Company, Cleveland, Ohio, which has a vinyl chloride/vinylidene chloride ratio of substantially 60/40.

EXAMPLE II

*Battery separator impregnation with 60/40 vinyl chloride-vinylidene chloride*

A solution of 25 parts by weight of the previously discussed "Geon 222," in 75 parts of xylene was coated upon a white alpha cellulose paper, having a weight per ream (500 sheets each 24 x 36 inches) of about 125 pounds, a thickness of about .031 inch and a porosity, in terms of air permeability before impregnation of about 4.5 seconds as determined by use of the previously referred to Gurley densitometer. This paper was passed through the "Geon 222" solution in xylene a single time with the solution being maintained at 80° F. After emerging from the solution, the web is passed between lightly set squeeze rolls, to remove any adherent solution which has not been absorbed in the web, and is then passed through a heating chamber to bake the web at a temperature of about 300° F. for about 10 minutes to evaporate and expell all of the solvent in the solution applied to the web. During the drying period the resin does not change chemically, but it fuses around the individual fibers of the web in such a manner as to form a chemically-resistant envelope around each fiber. The paper picked-up about 30% by weight of resin coating. After drying, the web is cut up into separate sheets, and any desired forming operation, such as ribbing or corrugating may be readily performed on the sheets. The resin is thermoplastic, and may be heat-formed by the application of pressure at temperature above about 180° F., after which it will retain the new shape. The separators so formed may be used as thus prepared, or supplemental applications of other materials may be added for particular purposes.

The paper must be saturated with at least 18 pounds of the resin for each 100 pounds of the raw paper. This is illustrated in the following Table I, in which the resin is the previously described "Geon 222," and the paper is the previously described present preferred example alpha cellulose paper.

TABLE I

[Chemical resistance with varying amounts of impregnating resin]

| Weight of 60/40 vinyl chloride/vinylidene chloride resin applied per 100 pounds of raw paper, lbs. | Effect on the impregnated paper after 4 days in concentrated sulfuric acid at room temperature |
|---|---|
| 9.4 | Completely disintegrated. |
| 18.2 | Slightly disintegrated. |
| 33.6 | Good condition. |
| 45.2 | Good condition. |
| 63.0 | Good condition. |

For purposes of comparison, the same paper, when impregnated with a conventional thermosetting phenolic resin for battery separators, was found to be charred and embrittled when subjected to the same sulfuric acid treatment for the same period of 4 days. The said thermosetting phenolic resin was applied at the rate of 47 pounds of the resin for each 100 pounds of the paper, by saturating the paper with a 40% solids solution of the resin in its "A" stage dissolved in an equal mixture of water and isopropyl alcohol, and then drying the paper and fully heat curing the resin to the "C" stage before making the comparative test.

The upper limit on the amount of the resin of the invention that may be applied to the paper stock is not critical, because the amount required to obtain excellent chemical resistance, which is the purpose of applying the resin, is far less than the maximum which can be applied without excessively reducing the air permeability of the impregnated paper. Obviously, there is no lower limit of the amount of resin employed, as far as effect on air permeability is concerned, because reducing the resin content causes the porosity and air permeability to approach that of the raw paper. The effect of the resin on air permeability is illustrated in the following Table II, in which the same resin and paper are used as for the tests shown in Table I.

TABLE II

[Effect of amount of resin on porosity of impregnated paper]

| Amount of 60/40 vinyl chloride/vinylidene chloride resin for each 100 pounds of raw paper, lbs. | Air permeability (Gurley densitometer), seconds |
|---|---|
| 0 | 4.2 |
| 9.2 | 4.3 |
| 18.8 | 4.4 |
| 34.6 | 4.8 |
| 46.4 | 5.1 |
| 64.8 | 5.4 |

For purposes of comparison, the same weight of paper saturated with a conventional phenolic resin as described above, had a corresponding air permeability of 4.8 seconds.

The present invention includes the utilization of certain oleoresinous, oil-soluble, alkaline condensed, non-heat hardening phenol-aldehyde resins together with the previously discussed vinyl chloride/vinylidene chloride copolymers for the purpose of conferring upon the latter improved corrosion resistance, particularly at elevated temperatures.

It is desired to point out that the oil-soluble, non-heat hardening phenol-aldehyde resins which are referred to herein do not in any way resemble the heat-hardening phenolic resins which have been previously employed in the production of battery separators. Briefly, the non-heat hardening and soluble resins used in the invention are not used in proportions sufficient to produce a practical and effective battery separator.

The non-heat hardening oil-soluble phenol-aldehyde resin component used in the invention can not be used per se, irrespective of proportions, for the production of battery separators because of their solubility and resistance to hardening upon being subjected to curing temperatures.

Generally, the oleoresinous, phenol-aldehyde resins which are utilized in accordance with the present invention comprise an oil-soluble, non-heat hardening phenol-aldehyde resin which is heat-bodied with an unsaturated drying oil. This mixture is normally heated in a kettle to dissolve the mixture, heat-bodied to the desired consistency and then thinned with solvent.

The drying oil constituent may include unsaturated drying oils such as fast drying oils having 2 or more conjugated double bonds in the molecule, e.g., Chinawood oil, oiticica oil and dehydrated castor oil; medium drying oils having 3 or more non-conjugated double bonds in the molecule, such as perilla oil, linseed oil, soy bean oil and the glycerides of the cupanodonic acid of fish oils; and semi-drying oils having two non-conjugated double bonds in an acid radical thereof such as poppyseed, rapeseed, and sunflower seed oils.

When employing semi-drying oils, it is necessary to employ higher temperatures for heat-bodying, such as temperatures in the range of 400° F.–450° F. The mixture being heat-bodied is blanketed with an inert gas and the heat-bodying takes about 2 hours. The mixture must be carefully watched so that the cooking is stopped when the desired viscosity is reached.

The trade refers to phenolic varnishes as being short oil, medium oil or long oil varnishes to indicate the number of gallons of oil used per 100 pounds of resin. The invention employs short oil varnishes which contain from 6 to 18 gallons of oil per 100 pounds of resin. Preferably the lower portion of the short oil range is used, e.g., from 6 to 15 gallons of oil per 100 pounds of resin.

The oil-soluble, non-heat hardening phenol-aldehyde resin is the condensation product of an aldehyde, preferably formaldehyde, with a phenol containing only a single hydroxy group in each phenolic nucleus which may be present. The condensation is effected in aqueous alkaline medium. Paraformaldehyde and acetaldehyde, etc. may be used in place of formaldehyde. The mol ratio of aldehyde to phenol may be 0.75:1. The condensation is performed in the presence of an alkaline catalyst such as sodium hydroxide, ammonia, zinc oxide, morpholine, benzylamine or other amine and the catalyst is normally present in an amount of about 1.0% by weight based on the weight of the phenol constituent.

The condensation is continued until the phenol-aldehyde reaction product has reached the non-heat hardening stage to produce a heat-non-reactive varnish. By a heat-non-reactive varnish is meant that there are sufficiently few free methylol groups in the phenol-aldehyde condensate as to avoid substantial further condensation during cooking with the oil.

The phenolic constituent of the phenol-aldehyde resin may be phenol substituted in the ortho and/or para position with an alkyl or aryl or aralkyl substituent. Thus, there may be used ortho or para cresol or mixed xylenols. The preferred phenolic constituent is para phenyl phenol. Para tertiary amyl phenol, para tertiary butyl phenol and para cyclohexyl phenol are also particularly desirable as the phenol constituent.

A drier, such as lead, cobalt, calcium, or manganese, resinate and/or napththenate, etc., may be introduced into the oleoresinous varnish or into the mixture of varnish and vinyl chloride/vinylidene chloride copolymer before the coating operation, to exercise its effect during the baking. One-twentieth percent of cobalt as cobalt naphthenate may, for example, be added to the oleoresinous varnish based on the weight of the oil, to accelerate the curing of the oleoresinous component.

In accordance with the present invention, the oleoresinous varnish described hereinbefore may be employed as a prime coat or it may be incorporated in the vinyl chloride/vinylidene chloride copolymer. In either event, the oleoresinous varnish appears to interact possibly through migration in the film of the vinyl chloride/vinylidene chloride copolymer to produce greater resistance to sulfuric acid decomposition, this resistance being particularly demonstrated at elevated temperatures of the order of 160° F. It will be understood that temperatures of 160° F. are substantially higher than are customarily encountered in normal battery operation. However, these higher temperatures are employed in the testing of battery compounds for the purpose of insuring that the battery and its components will function well under any possible condition of use.

EXAMPLE III

*Oleoresinous modifier A*

An example of a preferred oleoresinous modifier usable in accordance with the invention, is made as follows: 20 parts of oil-soluble para phenyl phenol/formaldehyde resin of the non-heat hardening type and 20 parts of tung oil are mixed in an open varnish kettle and heated to 350° F. in about 15 minutes, and are thereafter held at said temperature for an additional period of about 3 hours, to obtain a viscosity of 10–12 seconds at 350° F. (Zahn #3 cup). The exact cooking time is regulated to obtain thereby a resinoid which is compatible in aromatic solvent solution with the vinyl chloride/vinylidene chloride copolymer with which it is to be used. To permit handling the oleoresinous modifier after cooking, it is thinned with 60 parts of xylene, prior to adding it to the vinyl chloride/vinylidene chloride copolymer which is dissolved in additional solvent.

The oil-soluble para phenyl phenol/formaldehyde resin referred to above was produced by condensing 1 mol of para phenyl phenol with 1 mol of formaldehyde in water solution containing 1% by weight, based on the weight of the phenol, of ammonia. The solution was maintained at reflux until the exothermic reaction ceased and refluxing was continued for 1 hour to insure completion of the reaction.

If desired, a commercially available approximation of the above specified para phenyl phenol/formaldehyde resin may be used, for example, the product sold under the name "Bakelite BR–254."

EXAMPLE IV

*Oleoresinous modifier B*

3.6 parts of a non-heat hardening para-tertiary amyl phenol-formaldehyde resin and 28.6 parts of tung oil are heated to 350° F. in 30 minutes and held at that temperature for three hours. The mixture is then immediately mixed with 40.1 parts of a 50% solution of an unsaturated petroleum hydrocarbon resin ("Panarez 3–210") in xylene. The solution is then diluted with 27.7 parts of xylene.

The oil-soluble non-heat hardening para-tertiary amyl phenol-formaldehyde resin referred to above was produced by condensing one mol of para-tertiary amyl phenol with one mol of formaldehyde in water solution containing 1% by weight, based on the weight of the phenol, of ammonia. The solution was maintained at reflux until the exothermic reaction ceased and refluxing was continued for one hour to insure completion of the reaction.

The oil-soluble phenol-aldehyde resin specified above can be replaced by the commercially available product "Bakelite BR–4036."

EXAMPLE V

*Oleoresinous modifier C*

Example IV was repeated using para-tertiary butyl phenol in place of the para-tertiary amyl phenol of Example IV.

The porosity of alpha-cellulose paper after impregnation and baking was investigated with the porosity being measured as previously discussed with the Gurley densitometer. For purposes of control, the porosity of the Blandy alpha-cellulose paper used in the tests was measured without coating and after baking for two minutes at 420° F. The porosity in seconds of the control was 4.2. The paper tested was dipped and baked for 10 minutes at 350° F. and the resin pick-up and resulting porosity are presented in Table III which follows. Resin pick-up is measured by dividing the weight of resin remaining on the paper after baking by the dry weight of the paper and multiplying by 100.

TABLE III

[Porosity of resin-impregnated paper]

| Composition (Percent) | | Resin pick-up, Percent | Porosity in seconds |
|---|---|---|---|
| "Geon 222" | Modifier A | | |
| 75 | 25 | 29.4 | 5.0 |
| 90 | 10 | 27.9 | 5.0 |
| 75 | 25 | 22.1 | 4.3 |
| 90 | 10 | 22.7 | 4.4 |
| 100 | 0 | 21.2 | 4.6 |
| 100 | 0 | 33.0 | 4.9 |
| 100 (topcoat)[2] | 100 (primer)[1] | 5.0 / 25.0 | 5.2 |

[1] The primer was baked for 30 seconds at 350° F.
[2] The two-coat combination was baked for 10 minutes at 350° F.

As can be seen in table III, the porosity of the paper was substantially undiminished after impregnation and baking.

The inclusion of non-heat hardening oleoresinous phenol-aldehyde resin to a vinyl chloride/vinylidene chloride copolymer in various proportions was evaluated by immersing test specimens of impregnated Blandy alpha cellulose paper and measuring the loss in weight which occurred after three days immersion of the test specimens in sulfuric acid having a specific gravity of 1.26 and maintained at 160° F. The experiments were conducted in separate glass jars (14 oz.) each containing 450 cc. of the sulfuric acid and the jars were left uncovered, the water of evaporation being replaced daily. At the completion of the experiment, the specimens were rinsed 3 times with distilled water, the specimens remaining in the water for about 30 minutes in each rinse. The specimens were then air-dried to remove most of the water and then baked at 160° F. for 1 hour, cooled to room temperature and weighed. Under this test, commercial separators on an average contained about 45% to 50% by weight of thermoset phenol formaldehyde resin.

The test described above produced the following results; the weight pickup of resin being specified for each separator which was tested.

TABLE IV

[Evaluation of Modified Geon 222]

| Composition (Percent) | | | Resin Pick-up | Weight Loss |
|---|---|---|---|---|
| Geon 222 | Modifier A | Modifier B | | |
| 90 | 10 | | 34 | 16 |
| 75 | 25 | | 37 | 19 |
| 50 | 50 | | 37 | 30 |
| 90 | | 10 | 37 | 14 |
| 80 | | 20 | 38 | 20 |
| 50 | | 50 | 31 | 33 |

As can be seen from Table IV above, the inclusion in a vinyl chloride/vinylidene chloride copolymer, in accordance with the invention, of an oleoresinous, non-heat hardening phenol-aldehyde resin achieves improved resistance to sulfuric acid decomposition, as evidenced by weight loss. The improvement becomes substantial when about 5% by weight of phenol-aldehyde resin is used. The resistance to sulfuric acid decomposition reaches a maximum when approximately 10% by weight of the phenol-aldehyde resin is present. Further addition causes the acid resistance to fall off, as is shown in the table. After approximately 25% by weight of the resin combination is constituted by the phenol-aldehyde resin, the weight loss upon exposure to hot sulfuric acid increases rapidly. Accordingly, and in accordance with the invention, it is not desired to employ more than about 25% by weight of the phenol-aldehyde resin.

It has been found that the inclusion of about 10% by weight of Modifier A in Geon 222 using a resin pick-up of 25-35% and most preferably a pick-up of 30% produces outstanding resistance to hot sulfuric acid having a specific gravity of 1.26.

The phenol-aldehyde resin may be incorporated in the vinyl chloride/vinylidene chloride copolymer for simultaneous application to the paper from a common solvent solution, as for example xylene. This resin may also be utilized effectively to increase sulfuric acid resistance by application of the phenol-aldehyde resin from solvent solution to the untreated paper to impregnate this paper with about 4–10% by weigh of the phenol-aldehyde resin based upon the dry weight of the paper. The so-impregnated paper is then dried (air-dried or in an oven) and is then coated with a top-coat of vinyl chloride/vinylidene chloride copolymer which may or may not contain additional phenol-aldehyde resin. In Table V which follows the first coat of the phenol-aldehyde resin was applied with a resin pick-up of 5% and the impregnated Blandy alpha cellulose paper was baked for 30 seconds at 350° F. The second coat of vinyl chloride/vinylidene chloride copolymer was applied with a resin pick-up of 25% and baked for 10 minutes, at 350° F.

TABLE V

[Effects of multiple-coat system, on resistance to sulfuric acid]

| Coating System 1st Coat | 2nd Coat | Weight Loss |
|---|---|---|
| Modifier A | Geon 222 | 8 |
| Modifier B | Geon 222 | 7 |

In the tests reported above, the impregnated separator sheet was immersed for 3 days in sulfuric acid having a specific gravity of 1.26 and maintained at 160° F. in a closed jar.

The various impregnated Blandy alpha cellulose sheets refered to hereinbefore were also tested by spreading on these impregnated sheets a paste of lead peroxide followed by immersion of the lead peroxide-coated sheets in sulfuric acid (specific gravity 1.26) for 3 days at 160° F. in a closed jar. At the conclusion of these experiments, there was no visible evidence of deterioration of the impregnated sheet as a result of contact with lead peroxide in the presence of the hot sulfuric acid.

I claim:

1. A battery separator capable of being permeated with battery acid, but chemically resistant thereto, comprising a porous fibrous sheet, and at least 18 pounds of resin per 100 pounds of said individual fibrous sheet coating the fibers of said sheet, said resin comprising as the essential resin component thereof, a copolymer of vinyl chloride and vinylidene chloride in proportion by weight of 30% to 75% vinyl chloride, the balance being vinylidene chloride, said resin-impregnated sheet being characterized by such air permeability that 200 cc. of air at a pressure differential of 0.044 pound per square inch pass through one square inch of the impregnated sheet in about 2 to about 10 seconds.

2. A battery separator according to claim 1, in which the resin is a copolymer of vinyl chloride and vinylidene chloride in proportions by weight of 60/40.

3. A battery separator according to claim 1, in which the resin is a copolymer of vinyl chloride and vinylidene chloride in proportions by weight of 30% to 45% vinyl chloride, the balance being vinylidene chloride.

4. A battery separator according to claim 1, in which the sheet is a cellulosic sheet having a thickness of 0.028 to 0.040 inch.

5. A battery separator according to claim 1, in which the sheet is a paper sheet comprising at least 90% alpha cellulose and having a thickness of .031 inch.

6. A battery separator according to claim 1, in which the sheet is impregnated with 18 to 40 parts by weight of resin for each 100 parts by weight of the unimpregnated sheet.

7. A battery separator as recited in claim 1, in which the sheet is impregnated with 33 parts by weight of resin for each 100 parts by weight of the unimpregnated sheet.

8. A battery separator capable of being permeated with battery acid, but chemically resistant thereto, comprising a porous fibrous sheet, and at least 18 pounds of resin per 100 pounds of said individual fibrous sheet coating the fibers of said sheet, said resin comprising as the essential component thereof, a copolymer of vinyl chloride and vinylidene chloride in proportion by weight of 30% to 75% vinyl chloride, the balance being vinylidene chloride, and from 5% to 25% by weight based on the total weight of resin of an oleoresinous oil-soluble, alkaline condensed, non-heat hardening phenol-aldehyde resin, said resin-impregnated sheet being characterized by such air permeability that 200 cc. of air at a pressure differential of 0.044 pound per square inch pass through one square inch of the impregnated sheet in about 2 to about 10 seconds.

9. A battery separator as recited in claim 8, in which said oleoresinous phenol-aldehyde resin contains from 6 to 18 gallons of an unsaturated oil per 100 pounds of said phenol-aldehyde resin.

10. A battery separator as recited in claim 8, in which the phenol is para phenyl phenol of said phenol-aldehyde resin.

11. A battery separator as recited in claim 8, in which the phenol is para tertiary amyl phenol of said phenol-aldehyde resin.

12. A battery separator as recited in claim 8, in which the phenol is para tertiary butyl phenol of said phenol-aldehyde resin.

13. A battery separator as recited in claim 9, in which said unsaturated oil contains at least 2 double bonds in an acid radical thereof.

14. A battery separator capable of being permeated with battery acid, but chemically resistant thereto, comprising a porous fibrous cellulosic sheet containing at least 90% by weight of alpha cellulosic and having a thickness of about 0.30 inch, and resin coating the individual fibers of said sheet, said resin comprising as the essential component thereof, a copolymer of 60% by weight vinyl chloride and 40% by weight vinylidene chloride, and about 10% by weight based on the total weight of resin of an oleoresinous modifier comprising an oil-soluble, alkaline condensed, non-heat hardening resin produced by the condensation of about 1 mol of para phenyl phenol with about 1 mol of formaldehyde, said oleoresinous modifier containing about equal parts by weight of tung oil and phenol formaldehyde resin, said resin-impregnated sheet containing about 30% by weight of total resin and being characterized by such air permeability that 200 cc. of air at a pressure differential of 0.044 pound per square inch pass through one square inch of the impregnated sheet in 2 to 10 seconds.

References Cited in the file of this patent

UNITED STATES PATENTS

| | | |
|---|---|---|
| 2,431,745 | Flanagan | Dec. 2, 1947 |
| 2,543,137 | Uber | Feb. 27, 1951 |
| 2,564,397 | Duddy | Aug. 14, 1951 |
| 2,591,754 | Wilson et al. | Apr. 8, 1952 |
| 2,662,106 | Uhlig et al. | Dec. 8, 1953 |
| 2,810,775 | Raphael et al. | Oct. 2, 1957 |

UNITED STATES PATENT OFFICE
CERTIFICATE OF CORRECTION

Patent No. 2,953,622                                    September 20, 1960

Daniel M. Gray

It is hereby certified that error appears in the printed specification of the above numbered patent requiring correction and that the said Letters Patent should read as corrected below.

Column 7, line 5, for "cupanodonic" read -- clupanodonic --; column 10, line 10, for "weigh" read -- weight --; line 47, strike out "individual" and insert the same before "fibers" in line 48, same column 10; column 11, line 6, strike out "individual" and insert the same before "fibers" in line 7, same column 11.

Signed and sealed this 11th day of April 1961.

(SEAL)
Attest:
ERNEST W. SWIDER
Attesting Officer

ARTHUR W. CROCKER
                                                      Acting Commissioner of Patents